United States Patent [19]

Capellari et al.

[11] Patent Number: 4,675,793
[45] Date of Patent: Jun. 23, 1987

[54] ADJUSTABLE HEADLIGHT

[75] Inventors: Elio Capellari, Udine, Italy; Luciano Monteferrario, Montecarlo, Monaco; Carlo Wullschleger, Lugano, Switzerland

[73] Assignee: Limaverne Investment Limited, London, England

[21] Appl. No.: 624,179

[22] Filed: Jun. 25, 1984

[30] Foreign Application Priority Data

Jun. 24, 1983 [IT] Italy ................................ 83405 A/83

[51] Int. Cl.⁴ ........................... B60Q 1/06; F21V 3/18
[52] U.S. Cl. ...................................... 362/66; 362/267; 362/289
[58] Field of Search .................... 362/277, 66, 80, 267, 362/273, 289, 61, 68, 70, 275, 282, 287, 307, 310, 368

[56] References Cited

U.S. PATENT DOCUMENTS

| | | | |
|---|---|---|---|
| 1,413,811 | 4/1922 | Trippe | 362/277 |
| 1,552,328 | 9/1925 | Matthyssen | 362/277 |
| 1,610,127 | 12/1926 | Godley | 362/289 |
| 1,731,125 | 10/1929 | Cassetty | 362/309 |
| 1,761,911 | 6/1930 | Falge | 362/277 |
| 1,793,569 | 2/1931 | Toft | 362/277 |
| 2,266,329 | 12/1941 | Mead | 362/267 |
| 4,118,767 | 10/1978 | Urbanek | 362/267 |
| 4,415,956 | 11/1983 | McMahan | 362/289 |
| 4,509,106 | 4/1985 | Mayer | 362/371 |
| 4,569,007 | 2/1986 | Dick | 362/61 |

FOREIGN PATENT DOCUMENTS

| | | | |
|---|---|---|---|
| 583681 | 9/1959 | Canada | 362/277 |
| 99136 | 6/1964 | Denmark | 362/277 |
| 720510 | 5/1942 | Fed. Rep. of Germany | 362/277 |
| 1005465 | 4/1957 | Fed. Rep. of Germany | 362/277 |
| 3147938 | 9/1982 | Fed. Rep. of Germany | |
| 1578686 | 4/1969 | France | 362/277 |
| 7825324 | 3/1980 | France | |
| 131019 | 1/1929 | Switzerland | |
| 2126329 | 3/1984 | United Kingdom | 362/66 |

OTHER PUBLICATIONS

European Patent (PCT) 0013245, Jul. 1980.

Primary Examiner—Craig R. Feinberg
Assistant Examiner—David A. Okonsky
Attorney, Agent, or Firm—Wegner & Bretschneider

[57] ABSTRACT

This invention is embodied with a headlight (10) for motor vehicles or other road vehicles which comprises at least one transparent lens (11) and at least one parabolic mirror (12), perhaps assembled together with a spacer (13), at least the parabolic mirror (12) being adjustable in relation to the trim of the vehicle, the headlight including at least one rotatable connection means (20-21) defining an axis (41) of rotation about which at least the parabolic mirror (12) can swing so as to perform a first adjusting movement (34), such axis (41) of rotation being displaced towards such transparent lens (11).

7 Claims, 14 Drawing Figures

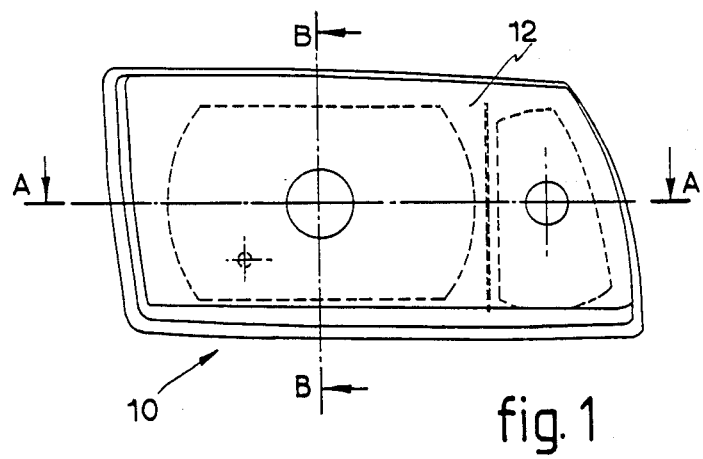
fig. 1
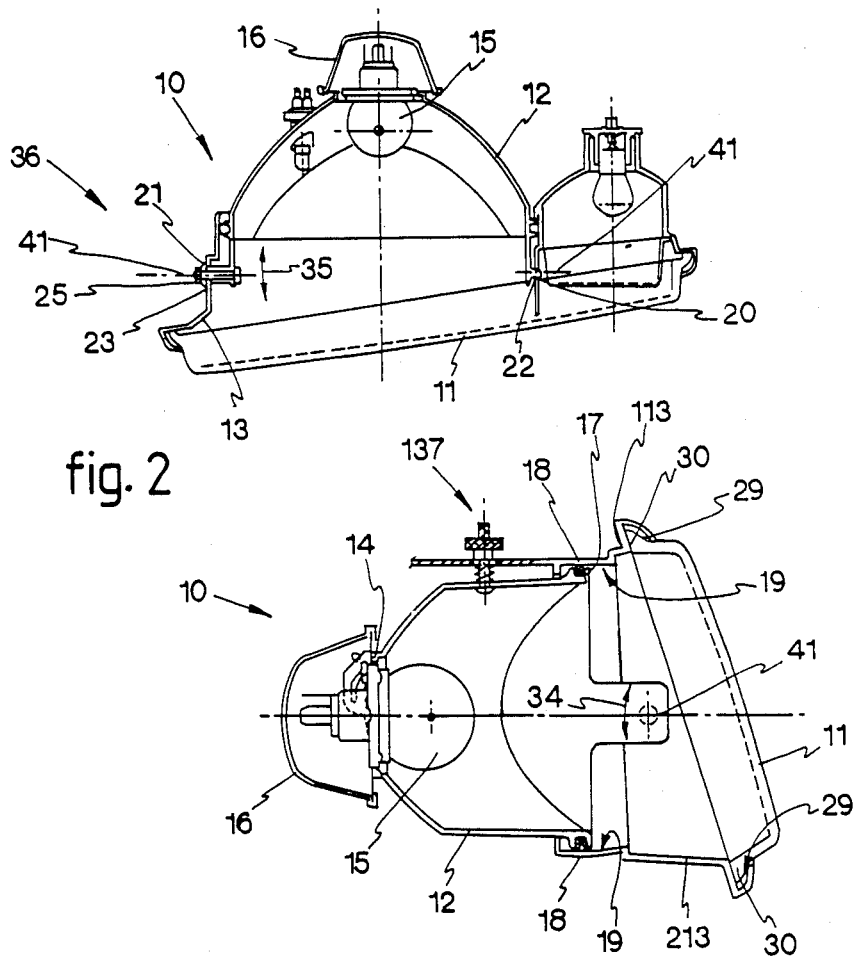
fig. 2
fig. 3

ADJUSTABLE HEADLIGHT

This invention concerns a headlight for motor vehicles which is adjustable in the horizontal and vertical directions and is embodied with a modest overall size.

The headlight of the invention is of a type envisaged for normal illumination at the front of motor vehicles or other vehicles which are advantageously but not only road vehicles and which have the headlight itself fitted in the front part of the bodywork of such vehicles.

As is well known, the orientation of the beam of light sent out by such headlights has to lie within well determined angles in relation to the direction of movement of the vehicle itself.

The invention can be applied to a headlight which carries out dipped and raised functions at one and the same time and also to headlights which carry out the above individual functions separately.

The invention can also be applied, in the most recent embodiments, to more complex devices which can comprise the functions of a fog light, side light and direction indicator.

As is known, headlights, especially for dipped use, have to be capable of being adjusted vertically so that, when the vehicle is loaded in a given way, they do not dazzle the drivers of vehicles coming in the opposite direction.

Such adjustment has been improved recently by taking the relative contol to the dashboard of the vehicle. This control acts on the device through a mechanical, electrical or hydraulic orientation adjuster.

The aerodynamics of new vehicles have made it necessary to integrate into the form of the bodywork the various lighting and signalling devices as well. The outer surfaces of such devices, therefore, have to be adapted to the profile of the bodywork.

Normally the glass of the headlight is fitted immovably to the bodywork.

Adjustment of the inclination of the beam of light emitted can in such a case be carried out by varying the inclination of the parabolic mirror in relation to the outer transparent lens.

This requirement is met at present by constructing large containers solidly fixed to the bodywork and by using very long adjusting screws to sustain and permit adjustment of the inner parabolic mirror (See DE OS No. 3.147.938, for instance).

According to another present embodiment the whole headlight consisting of the transparent lens and mirror can be adjusted.

Screws are used at present to perform this adjustment and act on peripheral points of the headlight itself (See FR No. 2.434.994, for instance).

The adjustment thus performed is complicated, hard to carry out and, above all, unsuitable for transient adjustments, such as, for instance, adjustments required to compensate for variations in trim due to load.

Next, there is the case of a headlight with an inner parabolic mirror capable of being moved in relation to a supporting paraboloid (see CH No. 131.019, for instance), but this embodiment is complex and unsatisfactory for modern requirements.

The first headlights made with a plastic parabolic mirror have been fitted recently and plastic transparent lenses are also in an advance stage of testing as replacements for traditional glass lenses.

These new embodiments are intended to lessen the weight of such headlights and also to simplify their production as much as possible and to contribute towards the improvement of their coefficient of penetration with new shapes.

The headlight of our invention has the purpose of reducing to an essential minimum the material employed and at the same time of simplifying the adjusting means and the assembly methods.

Besides the known advantages the special form provided for the components of the device of our invention offers interesting new advantages such as, for instance, the ability to employ, in a preferred embodiment on which we shall particularly dwell, standard mirrors for several types of headlights having differing outer appearances, thus providing obvious production economies, the ability to employ one adjusting point alone for both horizontal and vertical adjustments, the ability to replace the transparent lens alone or the mirror alone in the event of breakage, scratching or other damage, the ability to have access to adjustment by hand within the hood or from above or from outside the vehicle or on the dashboard according to the specific requirements and needs, smaller amplitude of displacement of the beam of light when adjusting for the trim of the vehicle and therefore a better quality of the beam emitted in all conditions of adjustment, a substantial equidistance of focus, so that a better optical result and better quality of the beam of light are obtained in all conditions of trim.

These and other advantages will be made evident in the following detailed description of the invention.

Our invention can be applied not only to traditional headlights made of steel sheet and glass but also to those made of plastic materials.

Thus the invention is embodied with a headlight for motor vehicles or other road vehicles which comprises at least one transparent lens and at least one parabolic mirror, perhaps assembled together with a spacer, at least the parabolic mirror being adjustable in relation to the trim of the vehicle, the headlight including at least one rotatable connection means defining an axis of rotation about which at least the parabolic mirror can swing so as to perform a first adjusting movement.

We shall describe hereinafter a preferred embodiment of the invention as a non-restrictive example with the help of the attached figures, in which:

FIG. 1 shows a front view of a headlight of the invention for motor vehicles with a direction indicator incorporated;

FIG. 2 shows a horizontal section of the headlight of FIG. 1 along the plane A—A;

FIG. 3 shows a vertical section of the headlight of FIG. 1 along the plane B—B;

Figure 4:
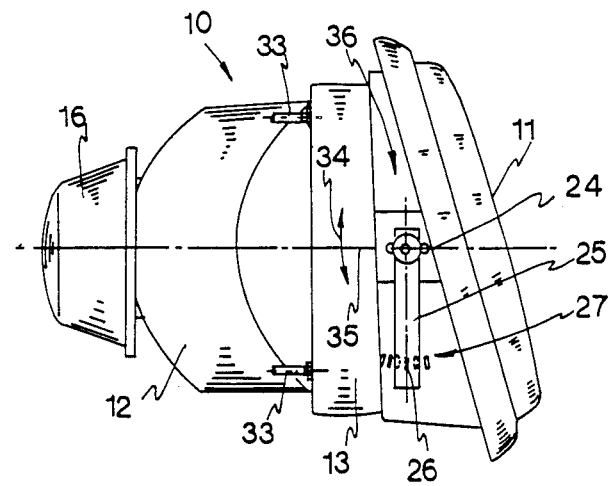
Figure 5:
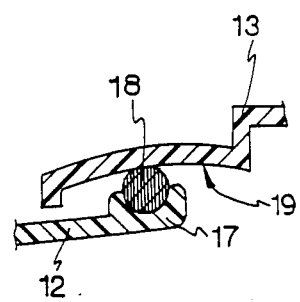
Figure 9:
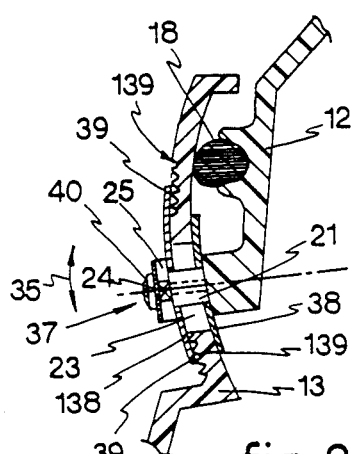
Figure 10:
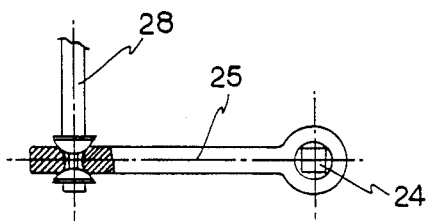
Figure 6:
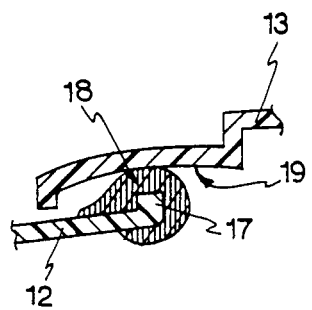
Figure 7:
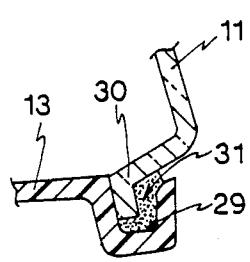
Figure 8:
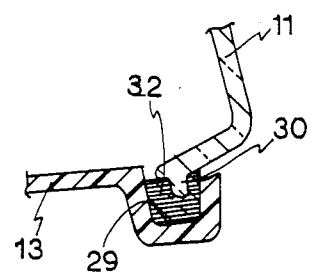

FIG. 4 gives a side view of the headlight of FIG. 1;

FIGS. 5 and 6 show different embodiments of the surfaces on which the washer runs;

FIGS. 7 and 8 give different embodiments of the connection between the transparent lens and the spacer;

FIG. 9 shows in detail the adjustment point;

FIG. 10 gives a view of an embodiment for adjustment operated from the driver's position;

FIGS. 11, 11a, 11b and 11c show a comparison between the different application points of the known art and that of the invention and also show a comparison between the individual beams of light.

A headlight 10 according to the invention is shown in FIGS. 1 to 4 inclusive and consists essentially of a transparent lens 11, which may be made of glass or of a plastic material, and of a metallized parabolic mirror 12.

The axis on which a substantially lengthwise horizontal plane lies bears the reference 141.

The mirror 12 may be made of a metallic or of a plastic material.

The lens 11 and mirror 12 in the embodiment shown are assembled and positioned in relation to each other by means of two halves 113 and 213 of a casing.

The plane of union of the two halves 113-213, which together form a desired spacer 13 between the mirror 12 and lens 11, can be obtained horizontally or vertically as required or according to any arrangement to suit the specific requirements. In the example shown here the plane of union is horizontal.

A bulb-holder flange 14 is located in the middle rear part of the parabolic mirror 12 and is able to accommodate a normal or a halogen bulb 15; the center of the source of light of the bulb 15 bears the reference F.

A cover 16 is fitted in a known way on the peripheral edge of the flange 14 and protects the bulb 15 and the electrical connections against weathering.

A front peripheral edge 17 of the mirror 12 is embodied in such a way as to be able to lodge a washer 18 capable of providing a satisfactory seal against weathering. This washer 18 provides also adequate friction between the mirror 12 and spacer 13, such as will ensure satisfactory stability even when there are vibrations.

This resilient adaptation between the various parts is able to absorb vibrations and thus improves the reliability of the whole device and prolongs the life of the bulb 15.

So as to enable the mirror 12 to be adjusted vertically there is included on each of the two halves 113-213 of the casing a concave surface 19 on which rests the washer 18 fitted to the peripheral edge 17 of the parabolic mirror 12.

The washer 18 does not entail problems of working life or resistance to heat since it lies very far from the bulb 15 and is partly screened by the parabolic mirror 12 itself.

According to the embodiments of FIGS. 4 and 9 the vertical and horizontal adjustments of the parabolic mirror 12 are concentrated at one single point 36. It is possible to take corrective action at this operating point 36 from the side, or from above, or from the front, or from the driver's position through a suitable transmission, depending on the location of the point 36 on the mirror 12 and on the method of access envisaged.

In our example the mirror 12 has two rotatable connection means 20-21 which here consist of pins solidly fixed to the mirror 12, one of the pins 20 acting as a fulcrum, whereas the other 21 acts as an adjustment point.

During assembly the pin 20 is lodged in a round hole 22 in the spacer 13, whereas the pin 21 enters a slot 23, within which it 21 can rotate about its own axis 41 according to the arrow 34 (see FIGS. 3 and 4) and can traverse according to the arrow 35.

Rotation of the mirror 12 about the axis 41 permits vertical adjustment of the mirror 12 itself and therefore of the beam of light projected, whereas horizontal traversing of the pin 21 according to the arrow 35 enables the mirror 12 to be adjusted horizontally.

Figure 11:
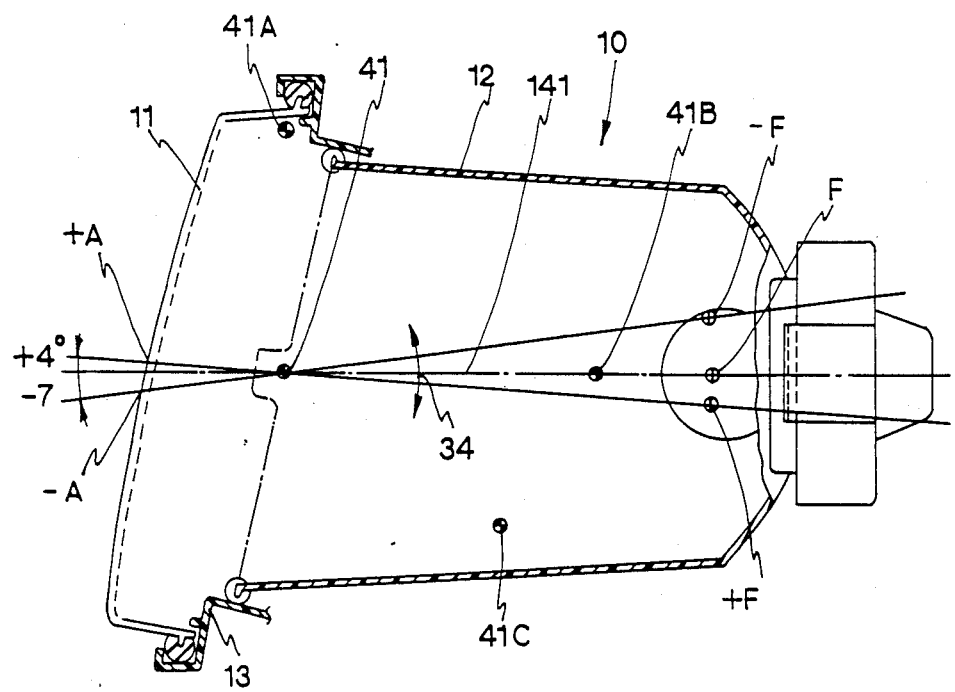

Rotation according to the arrow 34 can be of a desired amplitude or else of a pre-set amplitude as shown in FIG. 11, for instance.

According to the invention, contrariwise to what is shown in the figures, it is of course possible to envisage that horizontal adjustment is performed by rotation about an axis 41 and that vertical adjustment is obtained by displacement of one rotatable connection means 20 or 21.

The invention also visualises that the two adjustments are performed according to planes however inclined and however positioned at an angle to each other.

Since, as we said in the introduction, the outer surface of headlights has to be adapted to the profile of the rest of the bodywork, the initial setting of fixture screws 33 enables the value of the horizontal adjustment 35 to be eliminated or at least reduced.

FIG. 9 shows a possible, but not restrictive, embodiment of a means 37 to adjust the pin 21 solidly fixed to the mirror 12. The pin 21 cooperates with a slot 23 in the spacer 13.

In our example the slot 23 is set back in relation to the zone of action of the washer 18 and serves for horizontal adjustment 35.

The adjustment means 37 in our example comprise curved washers 38-138 and a clamping means 40 which consists here of a screw.

The pin 21 is positioned by the adjustment means 37 and is clamped in relation to the slot 23.

The outer washer 138 here has teeth 39 which cooperate with notches or hollows 139 in the spacer 13.

Horizontal adjustment takes place after the screw 40 has been slackened off, the screw 40 then allowing the teeth 39 to pass among the successive notches 139.

A lever 25 is shrunk onto a square end 24 of the pin 21.

The halting of adjustment at the various positions may be assisted with a tooth 26 envisaged on the lever 25, the tooth 26 cooperating with suitable notches or hollows 27 machined on the spacer 13 (FIG. 4).

FIG. 10 shows an embodiment in which the lever 25 is operated at a distance so as to perform vertical adjustment 34. In that figure the lever 25 is connected by a transmission rod 28 to actuation means which are not shown and are known in themselves and which can be operated, for instance, on the dashboard.

According to a variant shown FIG. 3, vertical adjustment 34 is obtained by acting on adjustment means 137 which in our example are located on the upper side of the spacer 13. In the embodiment shown the means 137 include a knurled knob cooperating with a screw. However, it is possible to use mechanical means of any type which are equivalent to the means 137.

The means 137 can also be positioned differently from the manner shown, depending on the requirements for practical usage and on the conformation of the bodywork.

The adjustment methods described above can be applied, under the invention, to embodiments in which the whole headlight 10 can be oriented. This is so not only in the event that the lens 11 and mirror 12 are assembled with a spacer 13 but also where the lens 11 and mirror 12 are assembled directly to each other without an intermediate spacer 13.

In the case under consideration, where the whole headlight 10 can be oriented, the rotatable connection means 20-21 will be solidly fixed to any parts of the headlight 10 and will enable the headlight 10 to be rotatably connected to the bodywork of the vehicle in the same manner as the parabolic mirror 12 and spacer 13 are rotatably connected together in the preferred embodiment shown.

As we said earlier, the two halves 113-213 of the casing, which in the example shown form the spacer 13, have in their frontal zone a peripheral groove 29 into which is inserted, during assembly, the peripheral edge 30 of the transparent lens 11 so as to ensure a rigid and stable assembly.

In the example shown in FIG. 7 the seal against weathering is provided by filling the space between the groove 29 and the edge 30 with sealing compound 31.

In the embodiment of FIG. 8 the seal is made by using a washer 32 inserted in the peripheral edge 30 between the lens 11 and spacer 13. This embodiment enables the lens 11 to be replaced in the event of breakage or deterioration. Such replacement is not possible in headlights now existing since the lens of such headlights is rigidly glued to the spacer.

The union of the two halves 113-213 of the casing can be obtained with one of the many known embodiments such as, for instance, normal screws or self-tapping screws, blades or springs for assembly by spring catch, clips or yet other means.

FIGS. 11, 11a, 11b and 11c give a comparison between the embodiment now proposed and the known art.

In FIG. 11 the axis of rotation 41 of the present invention is compared with the axes 41A, 41B and 41C respectively of the embodiments of FR No. 2.434.994, CH No. 131.019 and DE OS No. 3.147.938.

Figure 11A:
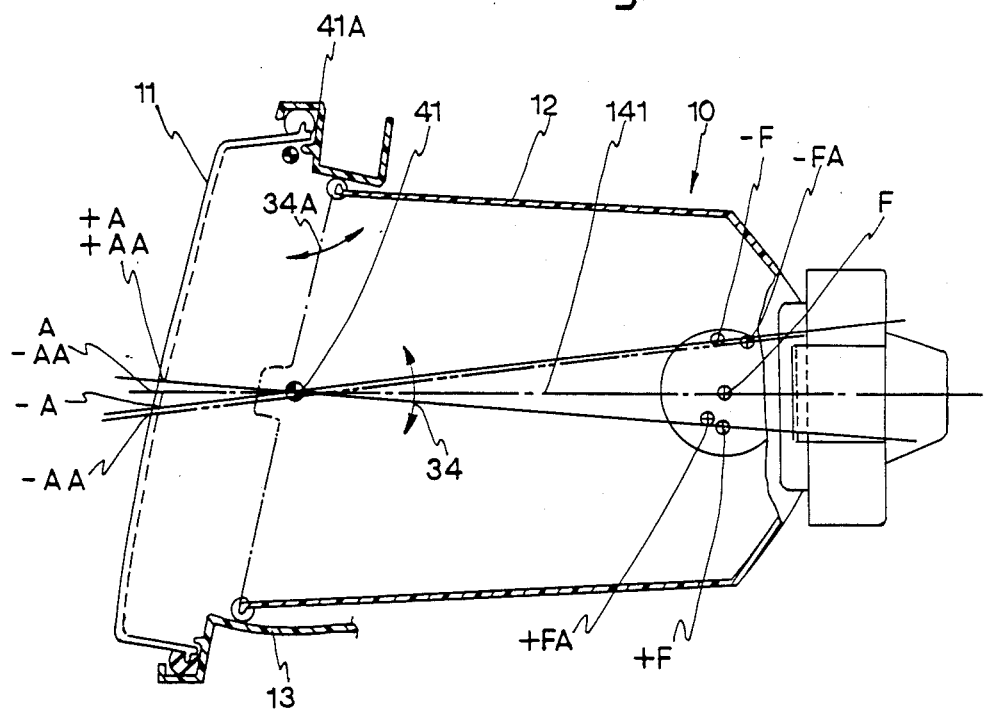
Figure 11B:
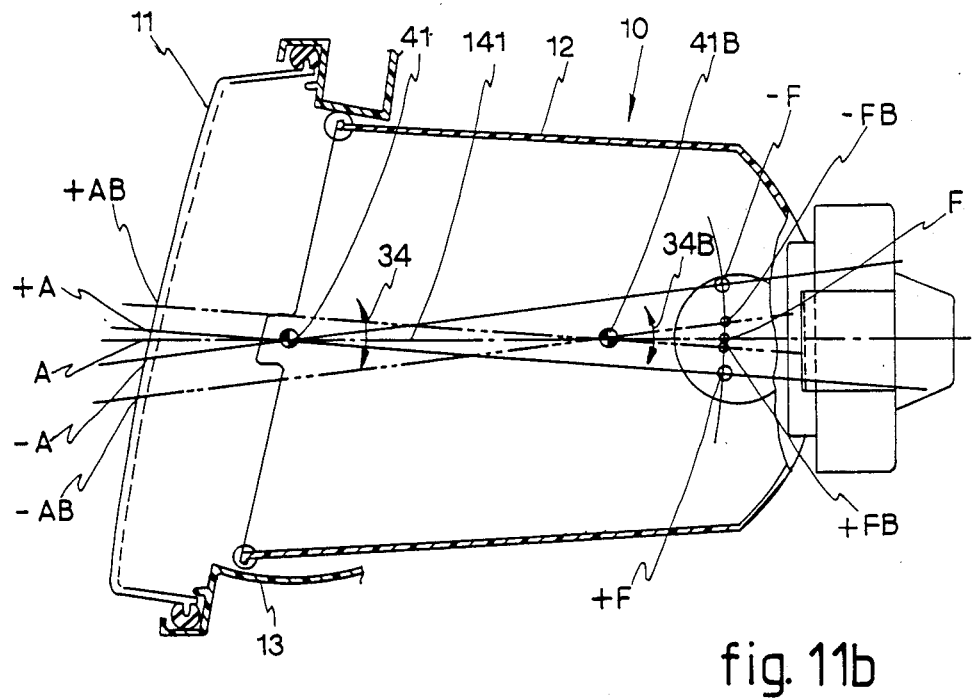
Figure 11C:
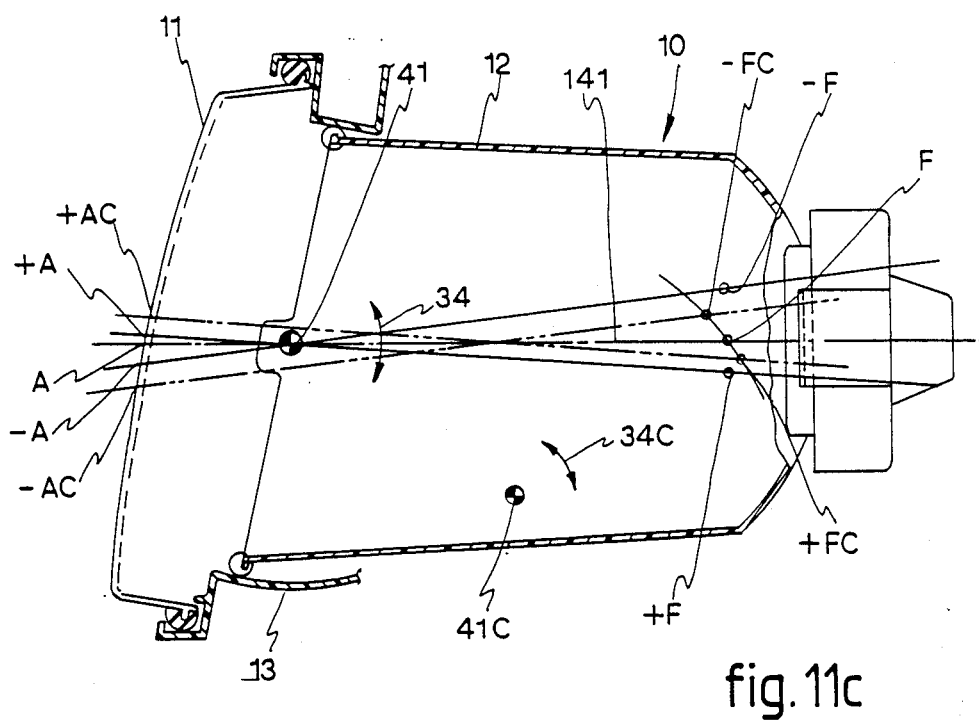

Such comparison is then examined individually in FIGS. 11a, 11b and 11c so as to make more evident the defects of the known embodiments.

Point A in the figures is the point corresponding with the intersection of the axis 141 with the lens 11.

FIG. 11a (a comparison of the present invention with FR No. 2.434.994) shows how the axis 141 is displaced in the two embodiments.

It is also possible to see in that comparison that the amplitude of the adjustment movement in the proposed embodiment (34) as compared to that of the known embodiment (34A) is such as to create a smaller displacement of point A.

Above all it can be seen that the movement of the focus F is more equidistant in the proposed embodiment than in the known embodiment, so that in the known embodiment the focus F performs a considerable lengthwise displacement.

FIG. 11b (a comparison of the present invention with CH No. 131.019) shows that the amplitude of the displacement of point A (adjustment movements 34 and 34B respectively) is smaller in the proposed invention.

FIG. 11c too (a comparison of the present invention with DE OS No. 3.147.938) provides once again the results of FIG. 11a, namely a smaller amplitude and an equidistance of focus.

The advantages listed in the foreword of this invention are thus shown clearly.

We claim:

1. A vehicle headlight, comprising:
   a transparent lens;
   a parabolic reflector, having an outer edge, adjustable in relation to a horizontal and vertical direction; a light source in said parabolic reflector projecting light through said lens to define a central axis
   a rigidly-supported spacer between the lens and the reflector, said lens being secured to said spacer, said reflector being rotatably secured to said spacer, said spacer being capable of supporting the headlight on a vehicle;
   a rotatable connector defining the sole means for adjusting both the horizontal and vertical orientation of said reflector;
   said spacer comprising a surface corresponding to that generated by the outer edge of the reflector upon rotation of the reflector to permit a first adjustment movement about a fist axis of rotation, said reflector being movable in a direction to displace the first axis of rotation toward and away from a central lens portion through which said central axis passes to provide a second adjustment movement.

2. The headlight of claim 1, wherein said rotatable connector cooperates with an adjustment means to displace said axis of rotation.

3. The headlight of claim 2, wherein the two adjusting movements take place in two different planes positioned at any desired angle with respect to each other.

4. The headlight of claim 1, further comprising a lever secured to said rotatable connector.

5. The headlight of claim 1, wherein the spacer is formed from two pieces which can be dismantled to permit replacement of a least one of the lens and the reflector.

6. The headlight of claim 1, wherein the spacer includes a groove for accepting the edge of the lens.

7. The headlight of claim 2, further comprising a means for stopping at least one of the adjustment movements at a pre-set position.

* * * * *